Figure 1:
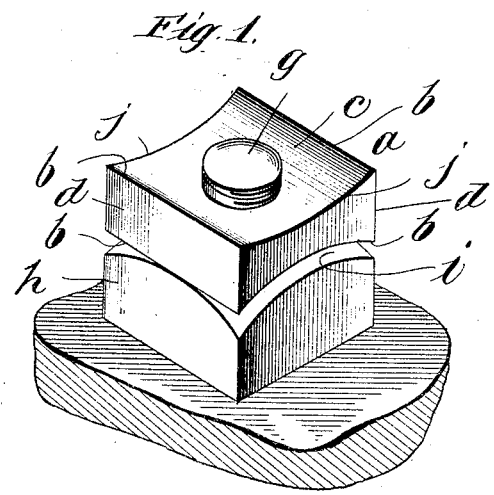

No. 845,250. PATENTED FEB. 26, 1907.
E. M. NEWMAN.
NUT LOCK.
APPLICATION FILED MAR. 6, 1906.

Witnesses
G. A. Raubenschmidt
Ethel M. Jones

Inventor
Evalyn M. Newman
By Harry Irwin Cromer
Atty

UNITED STATES PATENT OFFICE.

EVALYN M. NEWMAN, OF EVANSTON, ILLINOIS, ASSIGNOR TO HELEN LEE WARD, OF OAK PARK, ILLINOIS.

NUT-LOCK.

No. 845,250.

Specification of Letters Patent.

Patented Feb. 26, 1907.

Application filed March 6, 1906. Serial No. 304,507.

*To all whom it may concern:*

Be it known that I, EVALYN M. NEWMAN, a citizen of the United States, residing in Evanston, in the county of Cook and the State of Illinois, have invented certain new and useful Improvements in Nut-Locks, of which the following is a specification.

This invention relates to that class of nut-locks provided with bearing edges upon opposite sides of the axial center of the locking member and having concave or recessed surface portions between such bearing edges adapted to admit the chamfered face of a primary nut.
The principal object of the invention is to provide a simple, economical, and efficient nut-lock.

The ordinary primary nuts of commerce which are commonly used are chamfered, and it is desirable to provide a nut-lock adapted to be efficiently used in connection with such chamfered primary nuts. I have found that when a nut-lock is securely held in non-rotatable relation to a primary nut by means of sharp retaining edges in engagement with the primary nut on opposite sides of its axial center, as hereinafter described, the nut-lock and primary nut each having one or more complete spiral threads may be caused to engage the threads of the bolt with such firmness as to efficiently hold all three members—the primary nut, nut-lock, and bolt—in non-rotatable relation to each other without depending upon the distortion of the threads of the locking member. In other words, the tightening of a nut-lock constructed as hereinafter described upon a primary nut will not only hold the nut-lock and primary nut in fixed relation to each other, but will produce a binding effect or frictional engagement between the threads of these members and the threads of the bolt sufficient to efficiently hold all three members in non-rotatable relation to each other.
One of the principal objects of the invention, therefore, is to provide suitable means for holding the primary nut against accidental rotation with relation to the bolt in such a manner as to avoid the distortion of the threads of the locking member or nut-lock.

My improved nut-lock does not depend upon the binding engagement between the threads of the nut or nut-lock and bolt produced by distortion for holding the parts non-rotatably. On the contrary, it depends primarily upon the engagement of the sharp impinging or biting edges of the nut-lock with the surface of the primary nut against which such sharp impinging edges are forced so tightly and unyieldingly as to hold the parts in fixed relation without depending upon the distortion of the threads of the nut-lock or the body portion thereof.

One of the objects of the invention, therefore, is to provide a nut-lock having sharp impinging edges on opposite sides of its axial center in engagement with the adjacent surfaces of the primary nut and adapted to hold such members in fixed relation without distortion and consequent weakening of the nut-lock or locking member.

Other and further objects of the invention will appear from an examination of the drawings and the following description of the claims.

The invention consists in a nut-lock provided with sharp biting or impinging edges on opposite sides of its axial center having a concave or recessed portion therebetween, both of such edges being normally in the same plane at right angles to the axial center of the nut-lock and in position to engage and exert a substantially uniform pressure upon opposite sides of a primary nut and prevent the rotation thereof.

It consists, further and finally, in the features, combinations, and details of construction hereinafter described and claimed.

Figure 2:
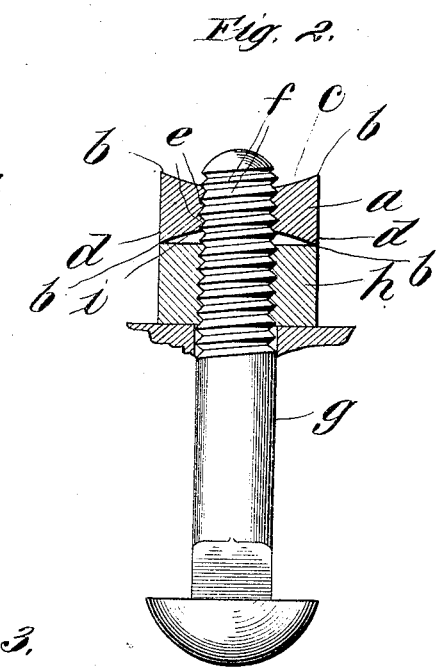
Figure 3:
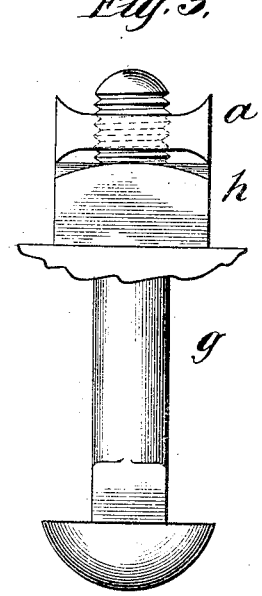

In the accompanying drawings, Figure 1 is a perspective view of a nut-lock constructed in accordance with my improvements; Fig. 2, a sectional view in elevation showing the nut-lock and primary nut member in operative position upon a bolt; and Fig. 3, a view in elevation of a modified form of nut-lock, showing the side surface portions of the nut-lock flat at the center.

In constructing a nut-lock in accordance with my improvements I provide a metallic nut-lock $a$, having straight parallel sharp biting retaining edges $b$ on opposite sides of its axial center and provided with hollow recessed or concave surface portions or side faces $c$ between such impinging or bearing edges on both the top and bottom sides of the nut-lock. The side faces of my preferred form of nut-lock, as shown in Fig. 1, are thus both concave or hollow throughout, and the retaining edges extend along opposite sides of each of such concave or hollow faces on a plane at right angles to the axial center of the nut and in position to be moved substantially simultaneously into retaining engagement with the surface of a primary nut, so as to exert a uniform or equal pressure on the opposite sides thereof and hold it against rotation without depending upon the distortion of the nut-lock or its threads. The outer surface portions $d$ of the nut-lock member extend directly away from the biting retaining edges at an abrupt angle to the concave side faces, with which they converge at each of such edges. The edges are therefore sharp and adapted to bite into the surface of the primary nut, so as to retain it in its proper position and securely hold it against rotation. The nut-lock thus formed is of sufficient thickness and of such material as to remain substantially rigid when in operative position and is provided with an axial perforation extending therethrough at right angles to the base formed by the retaining bearing edges, which are in the same plane and engage the primary nut to be held against rotation thereby. This axial perforation is provided with uniform substantially rigid spiral screw-threads $e$ in threaded engagement with the threads $f$ of the headed bolt $g$, upon which such lock is mounted. A primary nut $h$ is also provided having a threaded axial perforation through which the bolt extends. The concave or hollow face of the nut-lock is adapted to admit the chamfered face $i$ of the primary nut, so as to enable the sharp impinging biting edges of the nut-lock to engage the primary nut and firmly retain the parts in fixed relation to each other. The retaining edges of each side of the nut-lock, as already suggested, extend in parallel relation to each other and are normally in the same plane at right angles to the axial center of the nut-lock. The spiral threads of the locking member are at an incline with relation to the retaining edges, and the chamfered primary nut provides inclined wedge-like surface portions on opposite sides of the axial center of the nut, which extend at a different incline from that of the spiral threads. The rotation of the nut-lock in the proper direction not only tightens it upon the primary nut, by reason of the engagement of the retaining edges with the face of the nut, but also causes the threads of both the nut and nut-lock to tightly bind against or to frictionally engage the threads of the bolt. This binding engagement is so firm as to efficiently prevent all three members—the nut-lock, primary nut, and bolt—from rotating with relation to each other, except upon the application of force applied for the purpose of loosening them by rotation. The nut-lock thus aids the primary nut in resisting the strains to which it is subjected in use. The cutting edges exert a substantially equal pressure upon the opposite sides of the axial center of the primary nut and are each in biting engagement, so as to retain the primary nut in proper position and hold it against rotation.

In operation the strains to which the primary nut is subjected tend to press it toward the nut-lock. The binding effect between the threads of the nut-lock and bolt is thus increased. So also is the biting engagement between the retaining edges and the primary nut. The nut-lock may thus be caused to be tighter than the primary nut upon the bolt, and security against becoming loosened by accident is thus insured. The concave or hollow surface portions or recesses preferably extend from one to the other of the retaining edges $b$ or inner faces $j$ of the nut-lock and are out of engagement with the chamfered face of the primary nut when the parts are in operative position. By this arrangement the convex or chamfered portion of a primary nut will extend into the hollow side face of the nut-lock, or, in other words, into the recess between the sharp retaining edges of the nut-lock, so as to permit the proper engagement of the parts when a chamfered nut is used.

A nut-lock is thus provided having sharp parallel biting retaining edges adapted to be brought substantially simultaneously into engagement with the adjacent surfaces of the primary nut, so as to exert a uniform and equal pressure on opposite sides of its axis. The primary nut is held against rotation by the action of the biting retaining edges of the nut-lock and the frictional engagement with the threads of the bolt and does not depend upon the distortion or straining of the nut-lock member or its threads for retaining it in proper position. The nut-lock member is not required to be held under a constant strain in order to prevent the rotation of the primary nut or bolt, nor are the threads required to be distorted for such purpose, all of which would tend to weaken the parts. The nut-lock member is made as rigid or unyielding as possible, and its threads are continuous, of uniform strength, and as rigid as its body portion, so that when the nut-lock member and the primary nut are constructed and used together in the manner described the rigid nut-lock member supplements the primary nut in resisting the strains to which the latter is subjected in use. The resisting strength of both is much greater than when a flexible or distorted nut-lock member is required to be under constant strain. Furthermore, the efficiency of the nut-lock in preventing rotation of the parts is increased by reason of its rigidity and the constant unyielding quality of the sharp retaining edges, which may be forced into secure biting engagement with the primary nut, thus retaining it in fixed relation to the locking member and bolt.

I claim—

1. A rigid nut-lock provided with a threaded axial perforation and having biting retaining edges, both of such retaining edges being normally in the same plane at right angles to the axial center of the nut-lock on opposite sides of such axial center and having a recess therebetween.

2. A rigid nut-lock provided with a circular axial perforation having a spiral thread extending entirely around such perforation, and provided with a concave side face, and sharp retaining edges extending along opposite sides of such concave side face, both of such retaining edges being normally in the same plane at right angles to and on opposite sides of the axial center of the nut-lock.

3. A nut-lock provided with an axial perforation having a spiral thread extending entirely around such perforation and adapted to entirely encircle a bolt, such nut-lock having opposite hollow side faces, and having sharp biting retaining edges extending along opposite sides of each of such hollow side faces, both of such retaining edges for each face being normally in the same plane at right angles to and on opposite sides of the axial center of the nut-lock.

4. The combination of a nut-lock provided with a circular axial perforation having one or more complete spiral threads, and having sharp retaining edges, such retaining edges being normally in the same plane at right angles to and on opposite sides of the axial center of the nut-lock and having a recess therebetween, a bolt upon which such nut-lock is mounted, and a primary nut mounted upon such bolt in engagement with the sharp retaining edges of such nut-lock.

5. The combination of a nut-lock provided with a threaded axial perforation and opposite concave faces, each face having sharp projecting retaining edges extending along opposite sides thereof normally on a plane at right angles to the axis of the nut-lock, a threaded bolt upon which such nut-lock is mounted, and a nut in engagement with the adjacent sharp retaining edges of the nut-lock.

6. The combination of a nut-lock provided with a spirally-threaded axial perforation and having sharp retaining edges on opposite sides of such axial perforation, and a recess between such edges, a threaded bolt upon which such nut-lock is mounted, and a primary nut mounted in threaded engagement with such bolt, and having convex chamfered portions extending into the recess between the retaining edges of such nut-lock and engaged by such retaining edges.

EVALYN M. NEWMAN.

Witnesses:
HARRY IRWIN CROMER,
S. R. WOLFE.